(12) United States Patent
Kimura et al.

(10) Patent No.: US 11,693,925 B2
(45) Date of Patent: Jul. 4, 2023

(54) ANOMALY DETECTION BY RANKING FROM ALGORITHM

(71) Applicant: International Business Machines Corporation, Armonk, NY (US)

(72) Inventors: Daiki Kimura, Tokyo (JP); Subhajit Chaudhury, Kawasaki (JP); Michiaki Tatsubori, Oiso (JP); Asim Munawar, Ichikawa (JP); Ryuki Tachibana, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 17/099,363

(22) Filed: Nov. 16, 2020

(65) Prior Publication Data

US 2022/0156529 A1 May 19, 2022

(51) Int. Cl.
| | |
|---|---|
| *G06F 18/2413* | (2023.01) |
| *G06N 20/00* | (2019.01) |
| *G06T 7/00* | (2017.01) |
| *G06F 18/22* | (2023.01) |
| *G06F 18/213* | (2023.01) |

(Continued)

(52) U.S. Cl.
CPC ...... *G06F 18/24137* (2023.01); *G06F 18/213* (2023.01); *G06F 18/214* (2023.01); *G06F 18/22* (2023.01); *G06F 18/23213* (2023.01); *G06N 20/00* (2019.01); *G06T 7/00* (2013.01)

(58) Field of Classification Search
CPC ..... G06N 20/00; G06T 7/00; G06F 18/24137; G06F 18/213; G06F 18/214; G06F 18/22; G06F 18/23213
See application file for complete search history.

(56) References Cited

U.S. PATENT DOCUMENTS

| | | |
|---|---|---|
| 10,909,671 B2 | 2/2021 | Kimura |
| 2013/0101221 A1 | 4/2013 | Fujiki |
| 2018/0268207 A1* | 9/2018 | Kim ........................ G06T 13/40 |

(Continued)

OTHER PUBLICATIONS

Marghny et al, "Outlier Detection using Improved Genetic K-means" (published in International Journal of Computer Applications, vol. 28, Issue 11, pp. 33-36, Aug. 2011) (Year: 2011).*

(Continued)

*Primary Examiner* — Casey L Kretzer
(74) *Attorney, Agent, or Firm* — Stephanie L. Carusillo

(57) ABSTRACT

Aspects of the present invention disclose a method for a distance-based vector classification in anomaly detection. The method includes one or more processors identifying one or more audio communications from a first user to a second user, wherein the one or more audio communications is transmitted utilizing a first computing device. The method further includes determining an objective of the first user based at least in part on the audio communication of the first user. The method further includes determining a set of conditions corresponding to the one or more audio communications and the objective, wherein the set of conditions indicate a vulnerability of personal data of the first user. The method further includes prohibiting the first computing device from transmitting audio data that includes the personal data of the first user.

11 Claims, 3 Drawing Sheets

(51) Int. Cl.
G06F 18/214 (2023.01)
G06F 18/23213 (2023.01)

(56) References Cited

U.S. PATENT DOCUMENTS

2020/0074622 A1  3/2020  Yang
2020/0104990 A1  4/2020  Kimura

OTHER PUBLICATIONS

"Clustering as dimensionality reduction", 6 pps., downloaded on Aug. 13, 2020, <https://stats.stackexchange.com/questions/288668/clustering-as-dimensionality-reduction>.

Aytekin et al., "Clustering and Unsupervised Anomaly Detection with l2 Normalized Deep Auto-Encoder Representations", rXiv:1802.00187v1, [cs.LG], Feb. 1, 2018, 6 pps., <https://arxiv.org/pdf/1802.00187.pdf>.

Bergman et al., "Classification-Based Anomaly Detection For General Data", 12 pps, Published as a conference paper at ICLR 2020, <https://openreview.net/pdf?id=H1lK_IBtvS>.

Erman, et al., "Traffic Classification Using Clustering Algorithms", SIGCOMM'06 Workshops Sep. 11-15, 2006, 6 pps.

Fu, et al., "Similarity based vehicle trajectory clustering and anomaly detection", National Lab of Pattern Recognition, Institute of Automation, Chinese Academy of Sciences, Beijing, China, downloaded from the Internet on Nov. 10, 2020, 4 pps.

Jeon, "Centroid-based dimension reduction methods for classification of high dimensional text data ", Thesis, Jun. 2001, 17 pps.

Lloyd, "Least square quantization in PCM", IEEE Transactions on Information Theory, vol. IT-28, No. 2, Mar. 2, 1982, 9 pps.

Munz, et al., "Traffic Anomaly Detection Using K-Means Clustering", Downloaded from the Internet on Nov. 10, 2020, 8 pps.

Pang, et al., "An effective class-centroid-based dimension reduction method for text classification", Proceedings of the 22nd International Conference on World Wide Web, 2013, 2 pps.

Wang et al., "Unsupervised anomaly detection with compact deep features for wind turbine blade images taken by a drone", IPSJ Transactions on Computer Vision and Applications, (2019) 11:3, 7 pps., <https://ipsjcva.springeropen.com/articles/10.1186/s41074-019-0056-0>.

* cited by examiner

ANOMALY DETECTION BY RANKING FROM ALGORITHM

BACKGROUND OF THE INVENTION

The present invention relates generally to the field of machine learning, and more particularly to anomaly detection.

Anomaly detection (e.g., outlier detection) is the identification of rare items, events or observations that raise suspicions by differing significantly from the majority of the data. Anomaly detection is utilized in various domains such as, but not limited to, statistics, signal processing, finance, econometrics, manufacturing, networking and data mining. Typically, the anomalous items will translate to a problem such as bank fraud, a structural defect, medical problems, or errors in a text. Anomalies are also referred to as outliers, novelties, noise, deviations, and exceptions.

Cluster analysis or clustering is the task of grouping a set of objects in such a way that objects in the same group (e.g., a cluster) are more similar to each other than to objects in other groups (clusters). Clustering is a main task of exploratory data mining, and a common technique for statistical data analysis, used in many fields, including pattern recognition, image analysis, information retrieval, bioinformatics, data compression, computer graphics, and machine learning.

K-means clustering is a method of vector quantization, which is originally from signal processing, which aims to partition 'n' observations into 'k' clusters in which each observation belongs to the cluster with the nearest mean (e.g., cluster centers or cluster centroid), serving as a prototype of the cluster. This results in a partitioning of the data space into Voronoi cells. Cluster analysis is popular for use in data mining. K-means clustering has a loose relationship to the k-nearest neighbor classifier, a popular machine learning technique for classification that is often confused with k-means clustering due to the name.

SUMMARY

Aspects of the present invention disclose a method, computer program product, and system for a distance-based vector classification in anomaly detection. The method includes one or more processors identifying one or more audio communications from a first user to a second user, wherein the one or more audio communications is transmitted utilizing a first computing device. The method further includes one or more processors determining an objective of the first user based at least in part on the audio communication of the first user. The method further includes one or more processors determining a set of conditions corresponding to the one or more audio communications and the objective, wherein the set of conditions indicate a vulnerability of personal data of the first user. The method further includes one or more processors prohibiting the first computing device from transmitting audio data that includes the personal data of the first user.

DETAILED DESCRIPTION

Embodiments of the present invention allow for a distance-based vector classification in anomaly detection. Embodiments of the present invention identify visual features of one or more images. Embodiments of the present invention determine a distance vector for a test image. Additional embodiments of the present invention generate a score utilizing distance vectors of a test image. Some embodiments of the present invention distinguish a test image from a set images based on a generated score of the test image.

Some embodiments of the present invention recognize that challenges exist in anomaly detection algorithms techniques with respect to accuracy due to the generation vectors in high-dimensional spaces. For example, working in high-dimensional spaces can be undesirable for many reasons such as, raw data are often sparse due to the curse of dimensionality, and analyzing the data is usually computationally intractable. Embodiments of the present invention allow for transformation of data from a high-dimensional space into a low-dimensional space so that the low-dimensional representation retains some meaningful properties of the original data. Additionally, embodiments of the present invention can adapt to unlabeled anomaly samples as inputs.

Embodiments of the present invention can operate to improve computing systems by utilizing less computational power (e.g., processing resources) than conventional convolutional learning-based techniques. Additionally, various embodiments of the present invention improve the efficiency of processing resources of computing system by utilizing a clustering algorithm, which requires fewer processing resources than conventional convolutional learning-based techniques.

Implementation of embodiments of the invention may take a variety of forms, and exemplary implementation details are discussed subsequently with reference to the Figures.

Figure 1:
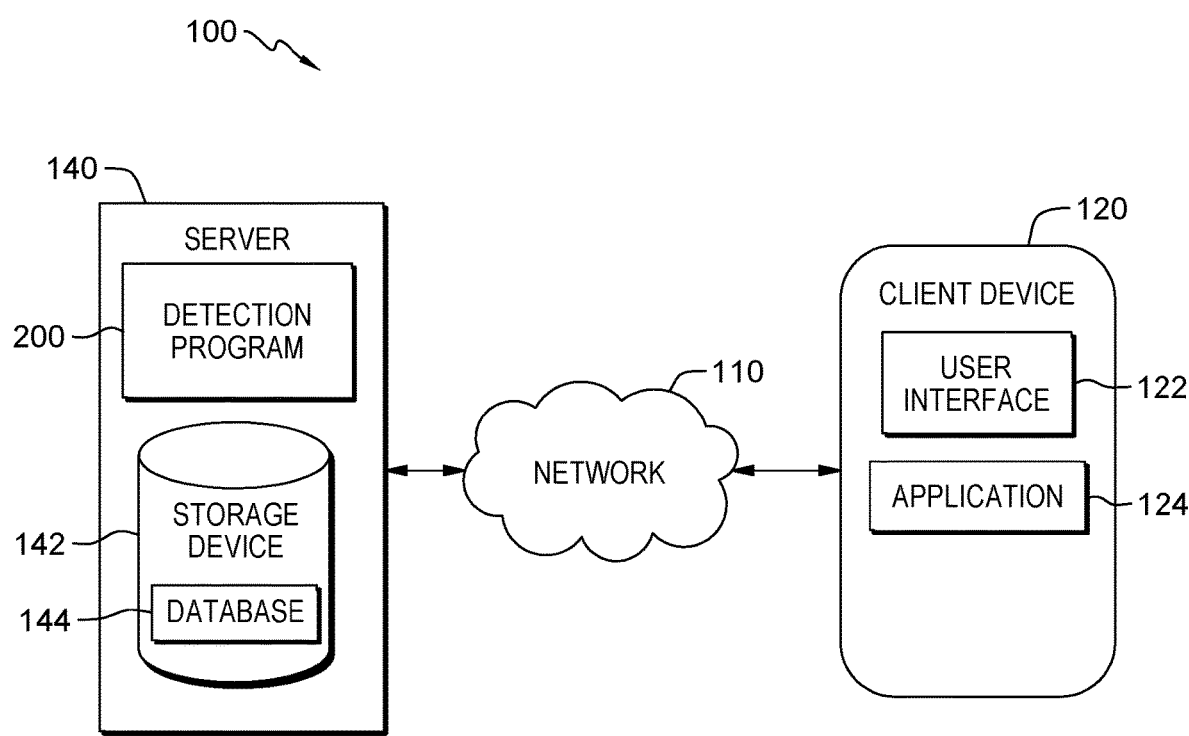
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Detection program 200 enables the authorized and secure processing of personal data. Detection program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Detection program 200 provides information regarding personal data and the nature (e.g., type, scope, purpose, duration, etc.) of the processing. Detection program 200 provides the user with copies of stored personal data. Detection program 200 allows the correction or completion of incorrect or incomplete personal data. Detection program 200 allows the immediate deletion of personal data.

Distributed data processing environment 100 includes server 140 and client device 120, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 and client device 120, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of detection program 200.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and detection program 200. Storage device 142 can be implemented with any type of storage device, for example, persistent storage 305, which is capable of storing data that may be accessed and utilized by client device 120 and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes training images, test images, visual features, centroid information, etc. In one embodiment, data processing environment 100 can include additional servers (not shown) that host additional information that accessible via network 110.

Generally, detection program 200 can classify an image as an anomaly utilizing a distance vector based on features of the image. In one embodiment, detection program 200 clusters a plurality of normal training images by using a plurality of sets of features of the normal training images. Additionally, detection program 200 obtains a set of centroid information for the sets of training images. Also, detection program 200 calculates distance vectors for a test image by using the set of centroid information and the set of features of the test image. Furthermore, detection program 200 ranks and selects a top "k" elements (e.g., from k-means clustering) to obtain a reduced distance vector. Moreover, detection program 200 generates a score vector by using the reduced distance vector and performs a classification-based anomaly detection for the test image by using the score vector.

Figure 2:
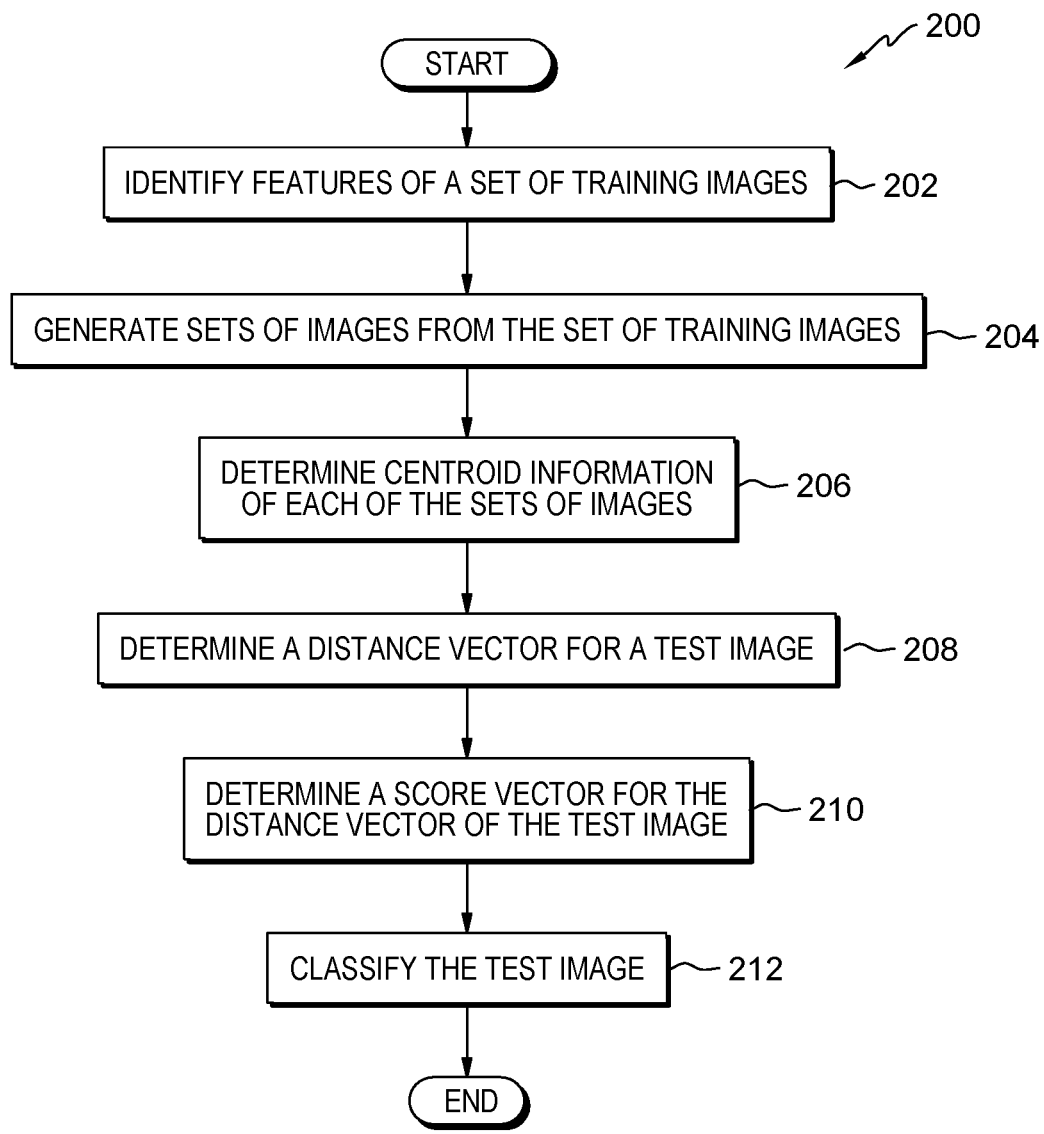
FIG. 2 is a flowchart depicting operational steps of a program, within the data processing environment of FIG. 1, for classifies an image as an anomaly utilizing a distance vector based on features of the image, in accordance with embodiments of the present invention.

FIG. 2 is a flowchart depicting operational steps of detection program 200, a program that classifies an image as an anomaly utilizing a distance vector based on features of the image, in accordance with embodiments of the present invention. In one embodiment, detection program 200 initiates in response to a user connecting client device 120 to detection program 200 through network 110. For example, detection program 200 initiates in response to a user registering (e.g., opting-in) a laptop (e.g., client device 120) with detection program 200 via a WLAN (e.g., network 110). In another embodiment, detection program 200 is a background application that continuously monitors client device 120. For example, detection program 200 is a client-side application (e.g., application 124) that initiates upon booting of a laptop (e.g., client device 120) of a user and monitors the laptop for an input of a test image.

In step 202, detection program 200 identifies features of a set of training images. In one embodiment, detection program 200 utilizes deep learning techniques to identify features of a set of training images. For example, detection program 200 utilizes a pre-trained machine learning algorithm (e.g., deep neural network (DNN), convolutional deep neural network (CNN), etc.) to identify features (e.g., derived values of an initial set of measured data) of each image of a set of training images which, can include higher-level features from each image. In one scenario, in image processing, lower layers of a DNN may identify edges, while higher layers may identify the concepts relevant to a human such as digits, letters, or faces etc. In this example, detection program 200 extracts a set of features (e.g., high-dimensional datasets) for each image of the set of training images, which includes the relevant information from the input data (e.g., input image) so that a desired task (e.g., anomaly detection) can be performed by using a reduced representation instead of the complete initial data (e.g., set of training images).

In step 204, detection program 200 generates sets of images from the set of training images. In one embodiment, detection program 200 utilizes a clustering algorithm to generate two or more sets images. For example, detection program 200 utilizes a machine learning technique (e.g., K-means clustering model), which identifies cluster centroids that minimize the distance between data points (e.g., training images) and the nearest centroid, to group a set of training images based on extracted high dimensional features as discussed in step 202. In this example, detection program 200 utilizes the clusters to generate classes (e.g., sets of images) based on the set of training images, where the distance (e.g., centroid of a cluster that is closest to a data point) between a training image and each group center (e.g., centroid) is utilized in classifying the training image. Furthermore, detection program 200 utilizes distances of the training images of the k-means clusters to classify each image of the set of training images into groups that have similar properties and/or features and data points in different groups should have highly dissimilar properties and/or features. Alternatively, detection program 200 generates a dictionary of 'k' vectors so that a data vector can be mapped to a code vector (e.g., input vector) that minimizes the error in reconstruction (i.e., vector quantization).

In step 206, detection program 200 determines centroid information of each of the sets of images. In one embodiment, detection program 200 determines centroid information for two or more sets of images of a clustering algorithm. For example, detection program 200 utilizes position information (e.g., vector data) of each point of a single cluster from a cluster table (e.g., database 144) to determine an average of the position information of the single cluster (i.e., determines a centroid of a cluster). In this example, a centroid is a vector that contains one number for each variable, where each number is the mean of a variable for the observations in that cluster (i.e., the centroid can be thought of as the multi-dimensional average of the cluster). Additionally, detection program 200 determines an average of position information for each cluster for the set of training images.

In step 208, detection program 200 determines a distance vector for a test image. In one embodiment, detection program 200 determines a distance vector corresponding to a feature of a test image a user provides via client device 120. For example, detection program 200 utilizes a pre-trained machine learning algorithm (e.g., deep neural network (DNN), convolutional deep neural network (CNN), etc.) to identify a set of features of a test image of a set of test images. In this example, detection program 200 calculates a distance vector for each feature of the set of features of the test image with respect to a centroid of each cluster determined in step 206.

In an example embodiment, detection program 200 can utilize an equation to calculate a distance vector '$d_{i,x}$' of a feature of a test image with respect to obtained centroid information, where:

$$d_{i,x} = \|f_x - c_i\|_2^2 \quad (1)$$

where '$f_x$' is an image feature of a given test image obtained from the pre-trained machine learning algorithm and '$c_i$' is centroid information from 'k' number of centroids (e.g., 2 clusters for 2 dimensional data) from the k-means clustering as discussed in step 206.

In step 210, detection program 200 determines a score for the distance vector of the test image. In one embodiment, detection program 200 performs a dimensionality reduction of the distance vector of the test image. In one scenario, detection program 200 utilizes a k-means clustering model to cluster the high-dimensional feature vectors of a set of training images with clusters, which results in a set of 'k' cluster centers (e.g., centroids). Detection program 200 can represent each of the original data points (e.g., features of the training images) in terms of how far the data point is from each of these cluster centers (i.e., can compute the distance of a data point to each cluster center), which result in a set of distances for each data point. Additionally, detection program 200 can utilize the set of distances for each data point to form a new vector dimension 'k' that represents the original data points as a new vector of lower dimension, relative to the original feature dimension. For example, detection program 200 can utilize values corresponding to a calculated distance vector '$d_{i,x}$' to sort each feature of a set of features of a test image in ascending order (e.g., the short the distance value the higher rank in the order). In this example, detection program 200 selects features above a defined threshold (e.g., $1^{st}$ ranked) to generate a reduced representation of the set of features of the test image (i.e., a reduced distance vector).

In another embodiment, detection program 200 generates a score for a distance vector corresponding to a feature of a test image. For example, detection program 200 utilizes a reduced distance vector of a set of features of a test image to generate a score vector of the set of features of the test image. In an example embodiment, detection program 200 can utilize an equation to convert a distance vector of a feature of a test image to a score vector '$s_{i,x}$', where:

$$S_{i,x}=1/(d_{i,x}+\epsilon) \qquad (2)$$

where is a reduced distance vector of a set of features of a test image and '$\epsilon$' is a small value in order to dividing by zero.

In step 212, detection program 200 classifies the test image. In one embodiment, detection program 200 utilize a score vector of a feature of a test image to detect an anomaly. For example, detection program 200 utilizes a machine learning algorithm (e.g., one class support vector machine (OCSVM), artificial neural network, etc.) to classify a feature of a test image using a generated score vector of the feature. In this example, detection program 200 trains the machine learning algorithm utilizing one or more training sets of data, which can be comprised of a set of training images with no anomalies (as discussed in step 202) and/or a set of training images with anomalies, to classify the test image (i.e., identify images that include an anomaly). Also, detection program 200 utilizes the generated score vector of the feature, which is based on a distance vector with respect to a cluster (e.g., group, class, etc.), to detect anomalies (e.g., outliers) in an unlabeled test data set of images by identifying features of the set of images that seem to fit least to feature data sets of respective clusters (e.g., centroids, classes, etc.).

In one scenario, detection program 200 inputs a generated score vector for a data input (e.g., a feature of a set of features of a test image) of an image into a OCSVM to determine whether the generated score vector of the data input of the image within a range of distances of each centroid. Additionally, if detection program 200 determines that the generated score vector is within the range of distances, then detection program 200 assigns the feature a positive classification. Furthermore, if detection program 200 determines that the generated score vector is not within the range of distances, then detection program 200 assigns the feature a negative classification indicating that the feature is an outlier.

Figure 3:
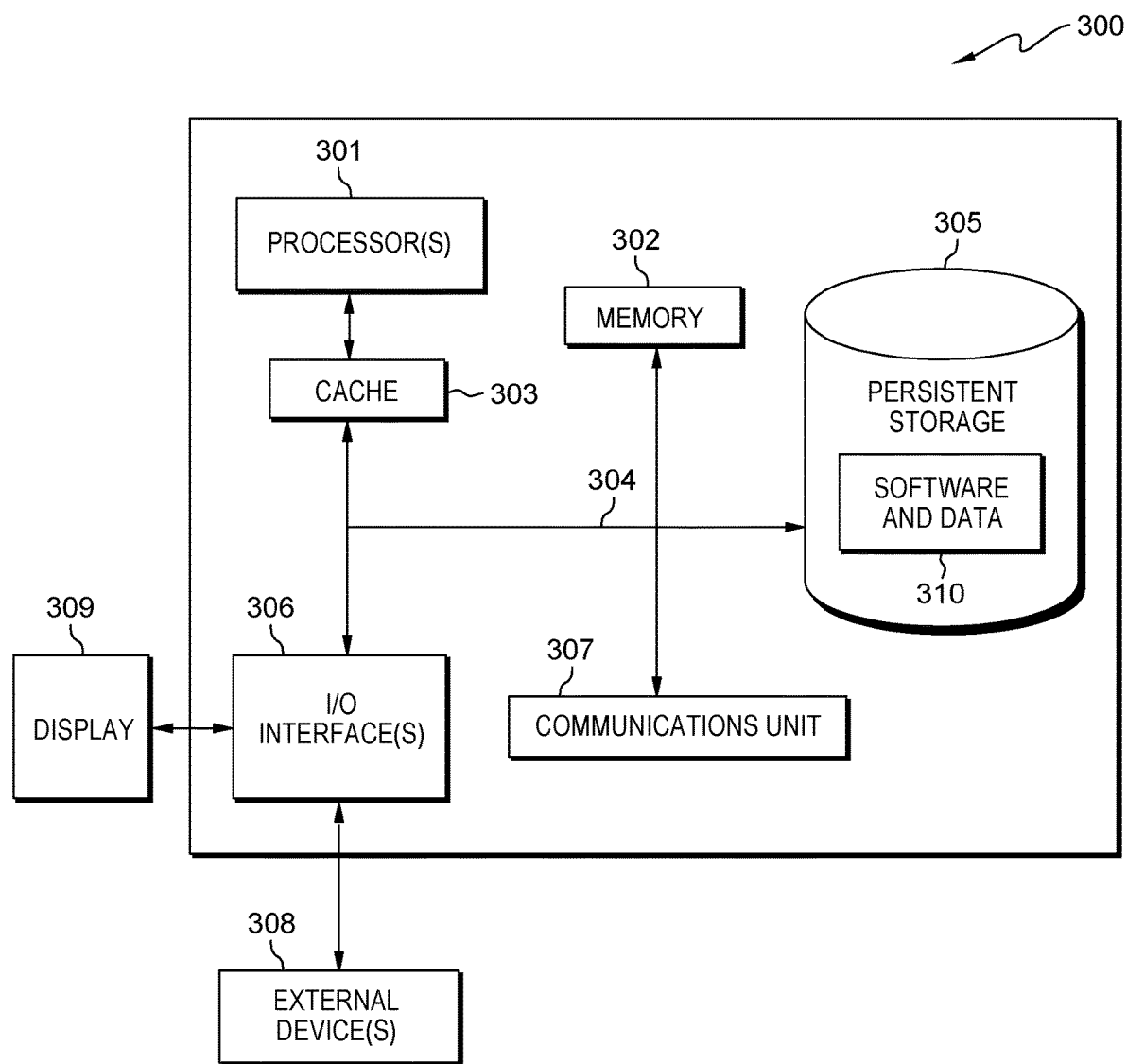
FIG. 3 is a block diagram of components of the client device and server of FIG. 1, in accordance with an embodiment of the present invention.

FIG. 3 depicts a block diagram of components of client device 120 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122 and application 124. With respect to server 140, software and data 310 includes data of storage device 142 and detection program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
generating, by one or more processors, one or more clusters of images from a set of training images using a clustering algorithm based at least in part on one or more sets of features of the set of training images to determine a respective centroid of each of the one or more clusters;
determining, by one or more processors, one or more distance vectors for a test image based at least in part on a set of features of the test image and the respective centroids of the one or more clusters;
generating, by one or more processors, a reduced distance vector for each distance vector of the one or more distance vectors for the test image, wherein generating the reduced distance vector further comprises:
sorting, by one or more processors, respective sets of features of the test image in ascending order utilizing a value identified for each distance vector corresponding to the respective sets of features; and
selecting, by one or more processors, a set of features of the test image above a defined threshold value from the ascending order to generate a reduced representation of the set of features of the test image;
generating, by one or more processors, a score vector based on the one or more distance vectors of the test image; and
assigning, by one or more processors, an anomaly classification to the test image based on the score vector.

2. The method of claim 1, further comprising:
identifying, by one or more processors, features corresponding to the test image utilizing the deep learning cognitive model; and
extracting, by one or more processors, a set of features corresponding to the test image, wherein the set of features includes a high-dimensional dataset.

3. The method of claim 1, wherein assigning the anomaly classification to the test image based on the score vector, further comprises:
generating, by one or more processors, a class corresponding to each of the one or more clusters of the set of training images; and
determining, by one or more processors, whether the score vector of the test image is within a range of distances of the classes of the one or more clusters.

4. The method of claim 1, wherein the clustering algorithm utilized is a k-means clustering model.

5. A computer program product comprising:
one or more computer readable storage media and program instructions stored on the one or more computer readable storage media, the program instructions comprising:
program instructions to generate one or more clusters of images from a set of training images using a clustering algorithm based at least in part on one or more sets of features of the set of training images to determine a respective centroid of each of the one or more clusters;
program instructions to determine one or more distance vectors for a test image based at least in part on a set of features of the test image and the respective centroids of the one or more clusters;
program instructions to generate a reduced distance vector for each distance vector of the one or more distance vectors for the test image, wherein generating the reduced distance vector further comprises:
program instructions to sort respective sets of features of the test image in ascending order utilizing a value identified for each distance vector corresponding to the respective sets of features; and
program instructions to select a set of features of the test image above a defined threshold value from the ascending order to generate a reduced representation of the set of features of the test image;
program instructions to generate a score vector based on the one or more distance vectors of the test image; and
program instructions to assign an anomaly classification to the test image based on the score vector.

6. The computer program product of claim 5, further comprising program instructions, stored on the one or more computer readable storage media, to:
identify features corresponding to the test image utilizing the deep learning cognitive model; and
extract a set of features corresponding to the test image, wherein the set of features includes a high-dimensional dataset.

7. The computer program product of claim 5, wherein program instructions to assign the anomaly classification to the test image based on the score vector, further comprise program instructions to:
generate a class corresponding to each of the one or more clusters of the set of training images; and
determine whether the score vector of the test image is within a range of distances of the classes of the one or more clusters.

8. The computer program product of claim 5, wherein the clustering algorithm utilized is a k-means clustering model.

9. A computer system comprising:
one or more computer processors;
one or more computer readable storage media; and
program instructions stored on the computer readable storage media for execution by at least one of the one or more processors, the program instructions comprising:
program instructions to generate one or more clusters of images from a set of training images using a clustering algorithm based at least in part on one or more sets of features of the set of training images to determine a respective centroid of each of the one or more clusters;
program instructions to determine one or more distance vectors for a test image based at least in part on a set of features of the test image and the respective centroids of the one or more clusters;
program instructions to generate a reduced distance vector for each distance vector of the one or more distance vectors for the test image, wherein generating the reduced distance vector further comprises:
program instructions to sort respective sets of features of the test image in ascending order utilizing a value identified for each distance vector corresponding to the respective sets of features; and
program instructions to select a set of features of the test image above a defined threshold value from the ascending order to generate a reduced representation of the set of features of the test image;

program instructions to generate a score vector based on the one or more distance vectors of the test image; and program instructions to assign an anomaly classification to the test image based on the score vector.

10. The computer system of claim 9, further comprising program instructions, stored on the one or more computer readable storage media for execution by at least one of the one or more processors, to:

identify features corresponding to the test image utilizing the deep learning cognitive model; and extract a set of features corresponding to the test image, wherein the set of features includes a high-dimensional dataset.

11. The computer system of claim 9, wherein program instructions to assign the anomaly classification to the test image based on the score vector, further comprise program instructions to:

generate a class corresponding to each of the one or more clusters of the set of training images; and determine whether the score vector of the test image is within a range of distances of the classes of the one or more clusters.

\* \* \* \* \*